Nov. 4, 1941.   J. C. MORRELL   2,261,481
BUILDING CONSTRUCTION
Filed Oct. 9, 1939
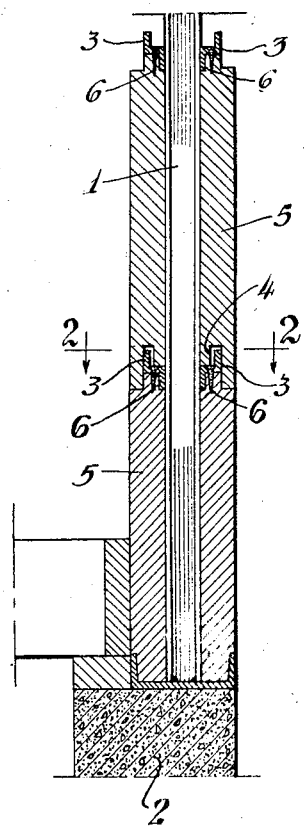
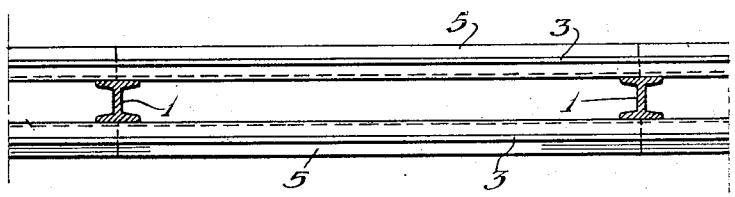

Patented Nov. 4, 1941

2,261,481

UNITED STATES PATENT OFFICE 2,261,481

BUILDING CONSTRUCTION

Jacque C. Morrell, Oak Park, Ill.

Application October 9, 1939, Serial No. 298,558

10 Claims. (Cl. 72—16)

This invention is a continuation in part of my applications No. 118,966 filed January 4, 1937, and No. 239,281, filed November 7, 1938, and particularly refers to an improved method and means of wall construction, especially adapted for use in buildings, such as residences, for example, wherein protection against heat and loss of heat is essential.

This invention is concerned principally with an improved method and means of installing and retaining building wall slabs or panels, preferably composed of material possessing good insulating qualities, in the walls of such a structure. These slabs are placed upon or adjacent to spaced stud members in the outer walls of the structure and are permanently affixed to the adjacent studs and thus retained in place in the wall by various alternative but non-equivalent means which do not impair the good insulating characteristics of the slabs, or of the wall as a whole. Preferably the slabs are so placed in relation to the studs as to provide a layer or thickness of insulation between the outer faces or flanges of the studs and outer faces of the wall.

One specific embodiment of the invention, wherein the structural frame work of the outer walls of a building includes spaced wood or metal studs such as, for example, H-columns, I-beams, or channels having flanges substantially parallel to opposite faces of the wall, the slabs of wall or insulating materials or pairs of slabs of insulating material or in general wall material facing one another, are attached to the studs by members as hereinafter described. In a specific embodiment the attaching means comprise devices which permit the slabs to be placed flush with the face of the stud or lie flat against it.

It is to be understood that the various methods described are non-equivalent although departures and variations within the scope of the invention are to be included therein.

As a feature of the present invention I may employ slabs or wall board made of fibrous or composition insulation material upon which is superimposed a relatively thin layer of separately formed plastic material, preferably made laminated fabric, e. g., paper saturated with a synthetic resin but which may also be in the form of a pre-formed sheet of plastic material such as from a molding mixture of a plastic and filler material or the molded plastic alone. This may be fixed integrally upon the insulation board or wall slab with a suitable adhesive and serves the purpose of both interior and exterior decoration and protection. The various modifications of the plastic layer are described and claimed more completely in an application which is copending with the present one.

In the drawing Fig. 1 is a sectional elevational view of a wall constructed in accordance with my invention. Fig. 2 is a plan sectional view taken on line 2—2 of Fig. 1.

I-beams 1, representative of studs generally, which may be of either wood or metal, but as illustrated here of metal, vertically disposed in space relationship upon a suitable foundation 2. I-beams 1 are joined together or function as a means of support by spaced transversely disposed Z-irons or right angle irons 3, one flange of the Z portion of the iron being secured by screws, bolts, welding or other means to flanges of I-beams 1. (Likewise the edge of a right angle iron may be welded to I-beams 1, giving the same general effect but usually having less structural strength.) The remaining flange of each of the Z-irons extends upwardly and is adapted to engage in elongated slots 4, provided in the lower edges of panels 5. The upper edges of the panels 5 are so cut as to conform with the lower portion of the Z-irons (or angle irons) and an extending and/or overlapping edge of the panel immediately above to assist in keeping the lower panel in place. Screws or nails 6 or similar means may also be passed through the horizontal part of the angle iron into the upper part of the panel to secure the same, in which case the bottom edge of the upper panel may if desired be flush with the upper edge of the lower panel, i. e., either one or both of these means may be employed to assist in securing the panels in position.

Overlapping sections of wallboard or insulating material or points of contact between the same may be joined together by any suitable adhesive.

In order to make the attaching means more secure and to prevent movement of the slabs or panels cement or cementitious materials or in general materials having adhesive and/or plastic properties which may set after drying or curing may be placed in or around the attaching means or the planes of contact of the panels just prior to placing the slabs in position.

Nailing strips may be employed wherever convenient or necessary for attaching either interior or exterior finishes, such as plaster or expanded metal for the interior or clapboard on the exterior. These may comprise wood strips suitably disposed in the slabs. Exterior or interior finishes may also be attached to the studs or to the angle irons by any similar means not shown.

Although wood-siding is indicated as the form the invention contemplates the use of any desired type of exterior finish for the wall slabs, such as, for example, brick or stone veneer, stucco, metal siding, or the like. Exterior finishes, such as plywood, or sheets of any other desired material which is sufficiently resistant to deterioration from moisture and varying weather conditions, may be applied to the slabs after they are installed or may be furnished integral with the individual wall slabs, being attached, in the latter case, to the underlying surface of the slabs by glueing, or in any other desired manner.

A plaster finish applied directly to the interior surface of the wall slabs may be employed although the invention contemplates the use of any other accepted type of interior finish, such as for example wood or plywood panels, metal sheets, tiling or simulated tile, linoleum or the like which may be integral with the slabs as they are installed, or may be attached thereto in any desired manner after the slabs are installed in the wall. Reinforced mesh, such as expanded metal lath, or the like, may be employed with plaster or other plastic finishes on the interior surface of the wall, when desired, as well as with the stucco finishes, or the like, for the exterior surface.

It will be apparent from the foregoing that the invention provides a number of related but non-equivalent methods and means of attaching slabs of wall materials to spaced stud members in the walls of a structure. Each of these methods and means is particularly well adapted to use with wall slabs composed primarily of the so-called "rigid" type of heat-insulating materials such as gypsum blocks or preferably slabs of insulation composed of fibrous materials, of vegetables, animal or mineral origin, as well as other types of insulating slabs or blocks such as, for example, cast or molded materials containing ingredients of good insulating quality or a high percentage of relatively small voids or pockets of entrapped air or inert gas. The features of the invention are particularly desirable in connection with the use of slabs or blocks of insulating materials since the methods and means of attachment provided do not materially decrease the overall efficiency of the insulating material used and eliminate penetrating members of high heat conductivity.

However, the invention is not limited to the use of materials of good heat insulating quality for the wall slabs, since the methods and means herein provided for attaching the slabs to spaced stud members will also prove advantageous for attaching other types of wall materials, particularly in certain types of buildings where a high degree of insulating efficiency is not essential. Molded or precast slabs of hydraulic cement, concrete, natural or synthetic resins, ceramic materials and the like may be attached to the framing members of any type of structure in the manner and by the means herein provided.

As applied to buildings such as houses, office buildings, factories and the like, any desired form and type of interior and exterior wall materials may be utilized in conjunction with the wall slabs. When plaster is employed as an interior finish it is preferably applied directly to the interior surface of the slabs although expanded metal lath, wire mesh or the like may, of course, be utilized as a base, when desired. Stucco and kellastone or the like may be applied to the exterior surface of the slabs either without or, preferably, with a suitable reinforcing mesh. Brick or stone veneer may be applied over the slabs and wood or metal siding of any desired type as well as wood or composition shingles may be employed as an external finish. When wood siding, shingles or panels of wood, metal or composite materials are employed suitable nailing strips may be anchored to the slabs in any desired manner such as, for example, by embedding or anchoring bolts, metal clips or the like in the insulating material and attaching the same to the nailing strips. Masonry veneer may also be anchored to the slabs in a similar manner. Such exterior finishes may also be directly attached to the studs.

It will also be understood that, although metal studs such as I-beams or H-columns are shown in the illustrations, wood framing may be employed with equal facility, in which case the wood studs may be of either square, rectangular, I or H shape in the cross-section, with the Z or other angle irons for attaching the slabs either nailed or bolted thereto.

It will, of course, be understood that various combinations of the features of the invention, other than the combinations illustrated and described, will be obvious to those skilled in the art and are therefore entirely within the scope of the invention, as defined by the appended claims. The same applies to various modifications and minor departures from the specific forms of wall slabs as well as the method and means of attaching the wall slabs, herein illustrated and described.

I claim as my invention:

1. A wall comprising in combination slabs of wall material, spaced supporting members, engaging members secured to said supporting members, each engaging member consisting of an element substantially parallel to the supporting member and connected thereto by an element extending outwardly from the face of the said supporting member, the edge of the engaging member formed by the juncture of these two elements being substantially parallel to the upper edge of the adjoining slab so as to permit said edge of the adjoining slab to pass the said edge of the engaging member to place the slab into position.

2. A wall comprising in combination slabs of wall material, spaced supporting members, engaging members secured to said supporting members, each engaging member having a flange parallel to and spaced from the supporting member adapted to interlock along at least one of the horizontal edges of the said slabs of wall material, the under edge of said engaging member being in a plane substantially perpendicular to the supporting member to permit the upper edge of the slab to be swung thereunder while the lower edge of said slab is in position on a lower engaging member.

3. A wall comprising in combination spaced stud members, slabs of wall material, engaging portions upon opposite edges of said slabs, engaging members secured to said stud members to engage said engaging portions of said slabs, said engaging members having an upstanding flange spaced from the stud and adapted to interlock along at least one of the horizontal edges of the said slabs of wall material, the engaging portions on one edge of each of said slabs contacting with an adjacent engaging portion on an adjacent slab to cover the said engaging members.

4. A wall comprising in combination slabs of wall material, spaced stud members, engaging members disposed upon and rigidly secured to said stud members, each engaging member having an upstanding flange spaced from the stud adapted to interlock along at least one of the horizontal edges of the said slabs of wall material, the under edge of said engaging member being in a plane substantially perpendicular to the said stud member to permit the upper edge of the slab to be swung thereunder while the lower edge of said slab is in position on a lower engaging member.

5. A wall comprising in combination slabs of wall material, spaced stud members, engaging members disposed upon and rigidly secured to said stud members, each engaging member consisting of an angle iron having an upstanding flange spaced from the stud adapted to interlock along at least one of the horizontal edges of the said slabs of wall material, the lower edge of said upstanding flange being substantially parallel to the upper edge of the adjoining slab to permit the upper edge of the slab to be swung thereunder while the lower edge of said slab is in position on a lower engaging member.

6. A wall comprising in combination slabs of wall material, spaced stud members, engaging members disposed upon and rigidly secured to said stud members, each engaging member comprising a Z-iron having an upstanding flange spaced from the stud adapted to interlock along at least one of the horizontal edges of the said slabs of wall material, the lower edge of said upstanding flange being substantially parallel to the upper edge of the adjoining slab to permit the upper edge of the slab to be swung thereunder while the lower edge of said slab is in position on a lower engaging member.

7. A wall comprising in combination spaced stud members, slabs of wall material disposed on said stud members, engaging portions upon opposite edges of said slabs, engaging members disposed upon said stud members to engage said engaging portions of said slabs, and means for securing the engaging members to the top of said slabs, the said means passing through the engaging members into the top of the said slab.

8. A wall comprising in combination spaced stud members, slabs of wall material, engaging portions upon opposite edges of said slabs, engaging members secured to said stud members to engage said engaging portions of said slabs, said engaging members comprising Z-irons secured transversely across adjacent studs.

9. A wall comprising in combination spaced stud members, slabs of wall material disposed on opposite sides of said stud members, the outer faces of which are disposed in substantially parallel planes, engaging portions upon opposite horizontal edges of said slabs, engaging members disposed transversely upon and secured to said stud members to engage said engaging portions of said slabs, said engaging members having an upstanding flange spaced from the stud members and adapted to interlock along at least one of the horizontal edges of the said slabs of wall material.

10. A wall comprising in combination spaced stud members, slabs of wall material disposed on said stud members, overlapping engaging portions upon opposite edges of said slabs, engaging members secured to said stud members to engage said engaging portions of said slabs, the engaging member upon one edge of each of said slabs comprising a projection and the engaging member on the opposite edge of each slab comprising a projection offset inwardly from said first mentioned projection and secured to the stud members, whereby the overlapping projection on the slab overlaps said first mentioned projection of an adjacent slab to cover said engaging members.

JACQUE C. MORRELL.